Figure 1:
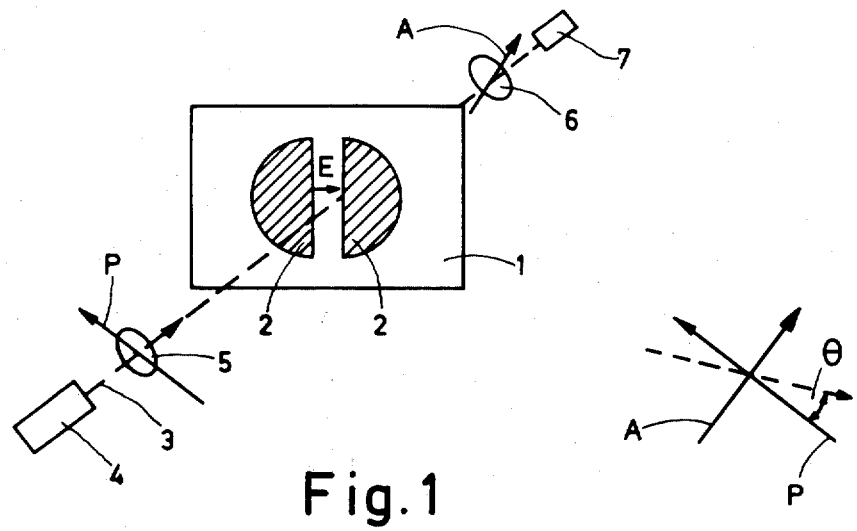

United States Patent [19]

Keve et al.

[11] 4,053,207
[45] Oct. 11, 1977

[54] ELECTRO-OPTIC DEVICES

[75] Inventors: Edward T. Keve, Warlingham; Keith L. Bye, Reigate, both of England

[73] Assignee: U.S. Philips Corporation, New York, N.Y.

[21] Appl. No.: 688,066

[22] Filed: May 19, 1976

[30] Foreign Application Priority Data

June 9, 1975 United Kingdom ............... 24622/75

[51] Int. Cl.² .............................................. G01B 1/00
[52] U.S. Cl. ................................................... 350/150
[58] Field of Search ......................................... 350/150

[56] References Cited

U.S. PATENT DOCUMENTS

| 3,847,465 | 11/1974 | Micheron | 350/150 |
| 3,868,172 | 2/1975 | Ii et al. | 350/150 |
| 3,871,745 | 3/1975 | Waku et al. | 350/150 |
| 3,955,190 | 5/1976 | Teraishi | 350/150 |

Primary Examiner—John K. Corbin
Assistant Examiner—R. A. Rosenberger
Attorney, Agent, or Firm—Frank R. Trifari; Carl P. Steinhauser

[57] ABSTRACT

An electro-optic device having a platelet of PLZT material, the birefringence of which depends on an electric field. The thickness of the platelet preferably is smaller than the thickness of one grain. As a result of this the sensitivity is large and this permits a low operating voltage in the device.

6 Claims, 6 Drawing Figures

ELECTRO-OPTIC DEVICES

This invention relates to electro-optic devices comprising a platelet of ferroelectric, ceramic material exhibiting birefringence which depends on an electric field and the individual grains of which have a domain structure.

Such a device may be used, for example, as an electrically controllable light gate, a picture display device, an optically readable memory, or for the optical projection of pictures.

In such an electro-optic device, the optically-active material employed may be a ferroelectric ceramic such as a lanthanum doped lead zirconate titanate (PLZT). When the value for the birefringence of such a material is known this enables the required electro-optic device to be designed, the minimum electrical voltage at which the device can operate, being also determined by the thickness of the platelet. Since this will normally be such as to produce optimum optical efficiency (that is a retardation of half a wavelength in the transmitted light) a reduction in the platelet thickness is not generally considered a desirable means for reducing the operating voltage.

It is the object of the invention to provide an electro-optic device of the kind mentioned in the preamble in which a high efficiency is combined with a low voltage of operation.

According to the invention, in an electro-optic device of the kind mentioned in the preamble, the thickness of the platelet of a ferroelectric ceramic material is smaller than twice the average grain diameter of the material.

Preferably, the thickness of the platelet is less than once the average grain diameter, and in particular equal to one half to one quarter of the average grain diameter. Conveniently, the ferroelectric ceramic material may be a lanthanum doped lead zirconate titanate (PLZT).

The very thin platelet may be secured to a supporting substrate and the surface may also carry an electrode structure such as interdigital mutually insulated electrodes.

To construct the electro-optic device of the invention therefore requires a knowledge of the average grain diameter in the chosen ceramic material and the ability to polish a thin platelet specimen of this to meet the above critical conditions as regards thickness. For instance, the PLZT material which is commercially available at present has the relatively small grain size of 4.5 - 7.5 micrometers. To polish a platelet of PLZT to a thickness of 10 micrometers or less may require special measures but methods for carrying this out are well known as will be discussed later.

Figure 4:
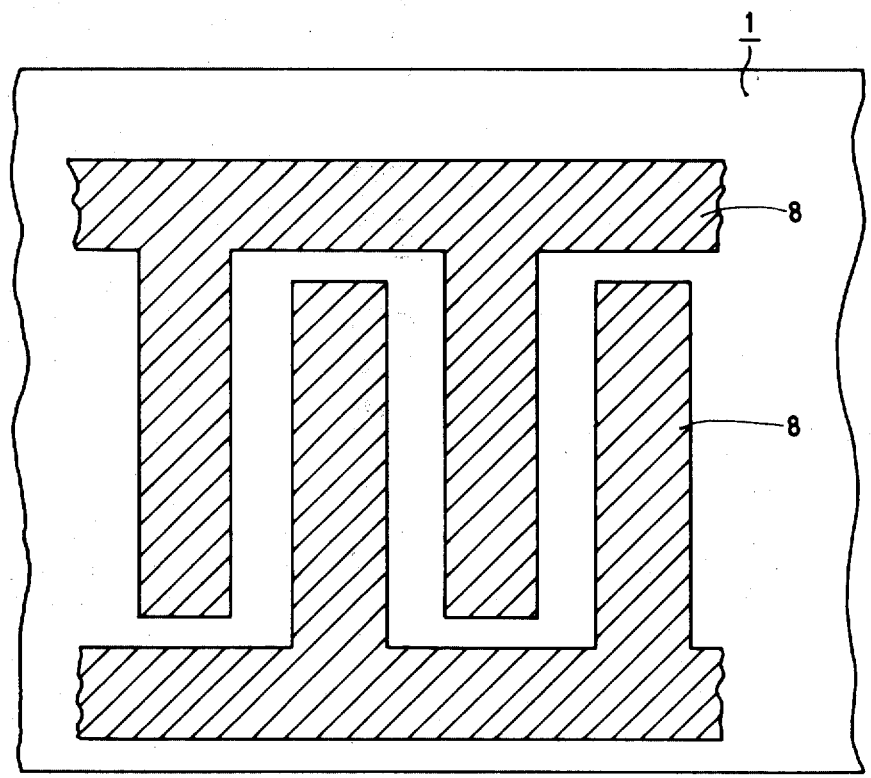
Figure 2:
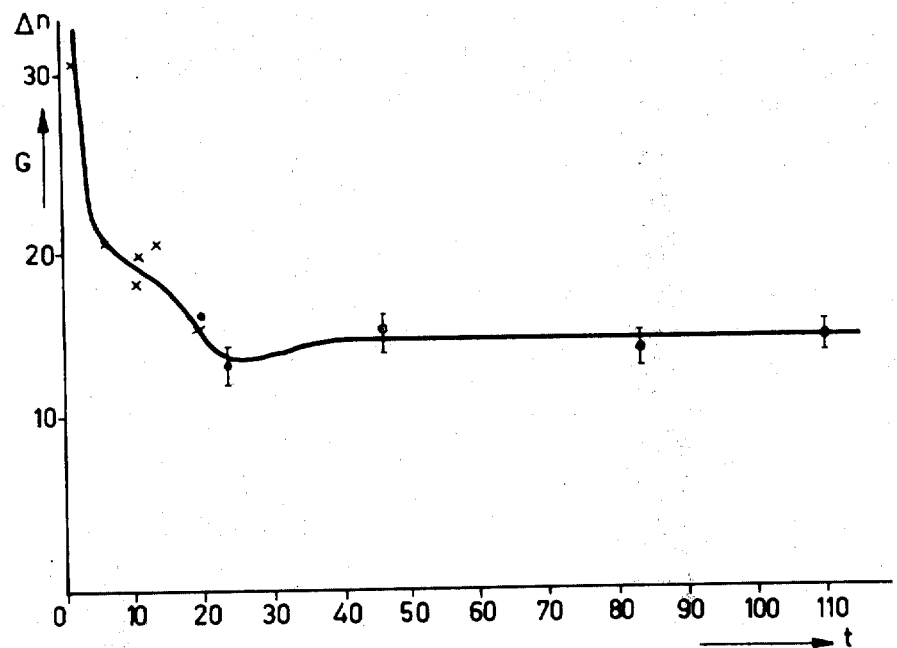
Figure 3A:
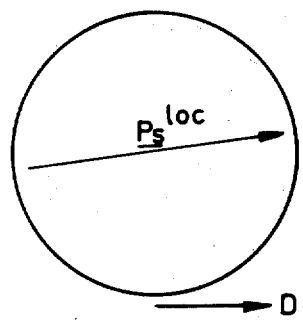
Figure 3B:
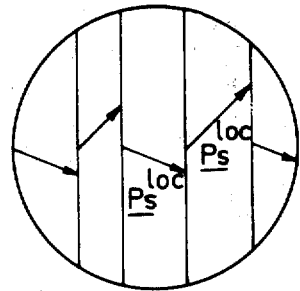
Figure 3C:
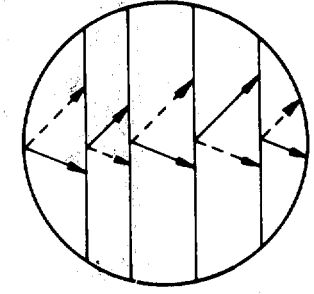

By way of example, particular embodiments of the invention will be further described with reference to the accompanying drawings, in which:

FIG. 1 shows an electrically controllable light gate apparatus set up to demonstrate the working of the invention, FIG. 2 is a graph showing on a vertical axis the birefringence value $\Delta n$ against thickness (in micrometers) for a specimen of PLZT ceramic, FIGS. 3a, 3b and 3c show the different kinds of sub-grain domain structure in a body of a ceramic composition, and FIG. 4 shows an interdigital mutually insulated electrode structure supported on a ceramic platelet.

FIG. 1 shows a platelet 1 which carries two semicircular electrodes 2 of gold. A light beam 3, from a laser source 4, can be passed through a polarizer 5, the platelet 1 and then a polarizer serving as an analyser 6. The intensity of the beam transmitted by the analyser 6 can be measured by means of a detector 7 in accordance with the electric field strength E between the electrodes 2. The polarizer 5 is oriented so that its direction of polarisation P is tilted 45° to the left of vertical. The gap between the electrodes 2 is orientated vertically. The direction of polarization A of the analyzer 6 is tilted 45° to the right of vertical.

In operation of the set up because the directions of polarization of the polariser 5 and analyser 6 are crossed at right angles, no light will be transmitted unless the state of polarization of the light transmitted by the polarizer 5 is varied by the platelet 1. When the platelet 1 is a birefringent crystal material, this produces an optical rotation of 0° which, as shown in the FIG. 1 insert, is the angle between the optic axis of the crystal and the direction of polarisation P of the polariser 5.

As is known, the light transmitted by the system is determined by the formula:

$$I_T = I_O \sin^2 2\theta \sin^2 \Gamma/2 \quad (1)$$

where $I_O$ = light transmitted with parallel polariser and analyzer and the crystal in its non birefringent mode (see below).

$\theta$ = angle between the optic axis of the crystal and polariser axis $\Gamma$ = retardation introduced by the crystal in radians and $\Gamma = \Delta n \times 2\pi x(t/\lambda)$ where $\Delta n(E)$ = birefringence of crystal (a function of the electric field E), $\lambda$ = wavelength of light used for measurement, and $t$ = crystal thickness.

Clearly, the transmitted light will be maximum when $\theta = 45°$ and $\Gamma = \pi$ rads ($=\lambda/2$). A number of materials exist for which $\Delta n = 0$ when no electric field E, is applied, but $\Delta n \neq 0$ with a field applied. With such an electro-optic material it is possible to modulate the light transmitted through the system described above, by modulating the field applied to the crystal. Such a system is commonly called a light gate.

In the case of the ferroelectric ceramic composition PLZT, it is found that the light transmitted through the system obeys approximately a relationship very similar to that given in Equation 1, namely $$I_T = I_O A \sin^2 (\overline{\Gamma}/2) \quad (2)$$

where $\overline{\Gamma}$ = an averaged retardation determined by the average birefringence of the ceramic composition according to $\overline{\Gamma} = \overline{\Delta} n \times 2\pi \times (t/\lambda)$ and $A$ = a constant.

The value of this constant, A, can be determined experimentally for a given material by measuring the ratio $I_T/I_O$ as a function of the applied field $E$ (and hence as a function of $\overline{\Gamma}$). Once A has been determined from the height of the first peak, Equation 2 may be used to calculate the net birefringence value, $\overline{\Delta} n$. Unfortunately it is found that Equation 2 is only generally valid for those cases where $\overline{\Gamma} < \pi$ radians. For $\overline{\Gamma} > \pi$ radians the optical retardation must be measured using a compensator, for example, a Soleil compensator. It is important to note that as a result of the sub-grain domain structure the Soleil compensator does not give the same value of $\overline{\Gamma}$ as that given by Equation 2 for very thin samples. However, the value of $\bar{\Gamma}$ given by Equation 2 is the relevant parameter for light gate type devices.

The thickness dependence of the net birefringence $\Delta n$ for a PLZT ceramic specimen of composition 8/65/35 (8% lanthanum, zirconate/titanate = 65/35) is shown in FIG. 2. This graph depicts on a vertical axis the birefringence value ($\Delta n \times 10^3$) against thickness $t$ (in micrometers) of the specimen. The average grain size of this PLZT material is 7.5 micrometers, and the ferroelectric transition to a cubic phase takes place at about 35° C. Measurements were made at room temperature (21° C) with an electric field E of 20 kV/cm applied. A vertical arrow G on the graph indicates the position of the average grain size of the material. It is clear that there is a significant increase in the net birefringence for specimen thicknesses in the region of two grains and even more so for thicknesses of one grain and less. For example, the net birefringence increases with respect to the bulk value by 35% at a thickness equal to the average grain size, and continues to increase by over 100% at a quarter of this thickness.

The reason why the net birefringence of platelets of PLZT of thickness less than the average grain size is greater than that of thick platelets can be explained as a result of the presence of sub-grain domain structure (FIGS. 3a, 3b and 3c).

FIGS. 3a, b and c show views of different crystal grains. The direction of the light beam passing the grains is perpendicular to the plane of the paper. The periphery of each circular area represents the boundary of a single crystal grain. In FIG. 3a, no domains are present in the grain. In response to an electric field having direction D, the crystal has been locally polarised in the direction of the arrow $Ps^{loc}$. The whole grain has thus become polarised and the resulting dielectric polarisation is almost parallel to the direction D.

The net birefringence value $\bar{\Delta} n$, of the single grain depends on the ceramic composition, crystal structure and the direction of the light beam relative to the optical axis of the crystal. In practice, however, the mechanical strain in the crystal grain as a result of the polarisation results in the presence of sub-grain domain structures as shown in FIG. 3b. FIG. 3b depicts a crystal grain as before but where domains are present in the crystal structure. Domain walls between the domains are indicated by vertical parallel lines. When the electric field is applied in the same direction D as before, each domain becomes separately locally polarised in the directions of the arrows $Ps^{loc}$. The net birefringence of one grain then is $\bar{\Delta} n_2$, where $\bar{\Delta} n_2 < \bar{\Delta} n_1$.

Additional changes in the value of the net birefringence will take place if the light beam passes through more than one grain. FIG. 3c shows such a configuration where two grains are superimposed with a complimentary grain structure. The Figure has thus become further complicated by the presence of domains in a second crystal grain and the domains in this second grain have become polarised in the directions indicated by the dotted arrows. The net birefringence that is then observed has a value $\bar{\Delta} n_3$, where $$\bar{\Delta} n_3 < \bar{\Delta} n_2 < \bar{\Delta} n_1. \quad (3)$$

For a ceramic that is many grains in thickness the net birefringence value that is observed will be less than that of $\bar{\Delta} n_1$ or even $\bar{\Delta} n_2$.

The relationships between $\bar{\Delta} n_1$, $\bar{\Delta} n_2$ and $\bar{\Delta} n_3$ are complex, but they are determined by composition, crystal structure, grain orientation and strain in the polarized grains. However, experimentally determined values of $\bar{\Delta} n_1$, $\bar{\Delta} n_2$ and $\Delta n_3$ are consistent with the inequalities given in Equation (3). Table I lists these parameters for two different PLZT materials, one with an orthorhombic structure and the other with a rhombohedral structure:

TABLE I.

| Net birefringence | Orthorhombic 8/65/35 | Rhombohedral 7.5/72/28 | Thickness | Technique |
| --- | --- | --- | --- | --- |
| $\bar{\Delta} n_1 \times 10^3$ | 35 | 55 | 2 μm | Michel Levy Colours |
| $\bar{\Delta} n_2 \times 10^3$ | 23.6 | 24 | half grain size | Light Gate |
| $\bar{\Delta} n_3 \times 10^3$ | 14.4 | 16.8 | 75 μm | Soleil Compensator |

The invention can be applied in the construction of devices such as display devices, filters, imaging systems or memory devices which make use of the light gate principle so as to reach an operating voltage which is as low as possible. Such a construction is depicted in FIG. 4, in which the surface of the platelet has a structure of interdigital mutually insulated electrodes. On the PLZT platelet 1 two electrode areas 8 are arranged so that a substantial proportion of the platelet surface is subjected to an electric field when a voltage difference is applied between the electrode areas 8. A set of such light gates, with or without interdigital electrodes can also be arranged to form patterns suitable for numeric and alphanumeric display devices.

Platelets of the required thickness can be manufactured as follows:

a. Using currently available PLZT ceramic material which has a relatively small grain diameter (of 4.5 to 7.5 micrometers), platelets of thickness ten micrometers or less may be prepared by a polishing technique. Suitable polishing techniques have been described by G. W. Fynn, W. J. A. Powell, M. Blackman and D. Jenner, J. Phys. E : Scientific Instruments 391,4, (1971) and by E. Mendell, SCP and Solid State Technology 36, August (1967). The platelet may be initially secured to a supporting substrate to facilitate the polishing operation and subsequent handling of the ceramic body. After polishing, a fine electrode structure with a gap of five to ten micrometers between the fingers is then deposited on one surface. Using either of the two PLZT materials noted in Table I, that is with compositions 7.5/72/28 or 8/65/35, an efficient low voltage (ten to twenty volts) of operation is obtained.

b. A device with an optimum efficiency (a half-wavelength retardation) can alternatively be constructed by first producing large crystal grain PLZT material, say having an average grain diameter of forty micrometers. If this crystal material was then polished to a thickness of ten micrometers (one quarter of the average grain diameter) a retardation of a half-wavelength is obtained if the orthorhombic crystal structure material, 8/65/35 composition, was used.

The invention of the application is not only applicable to electro-optic devices which are electrically addressed but also to such devices which are thermally addressed. In this instance, the ceramic material selected for the device will not only have a field dependent birefringence and a sub-grain domain structure, but also will preferably show a phase transition suitable close to the required operating temperature of the device. The device can also be used when the materials in bulk form would scatter too much light.

The foregoing descriptions of embodiments of the invention have been given by way of example only and a number of modifications may be made without departing from the scope of the invention as defined by the appended claims. For instance, it is not intended that the invention should be restricted to ferroelectric material only exhibiting birefringence but the material may also exhibit pyroelectric or piezoelectric properties.

We claim:

1. An electro-optic device including a platelet of a ferroelectric ceramic material having an electric field-dependent birefringence value and the individual grains of which have a domain structure, in which the thickness of the platelet is smaller than twice the average grain diameter of the material.

2. A device as claimed in claim 1, in which the thickness of the platelet is smaller than once the average grain diameter of the material.

3. A device as claimed in claim 2, in which the thickness of the platelet is equal to one half to one quarter of the average grain diameter of the material.

4. A device as claimed in claim 1, in which the platelet of ceramic material is secured to a supporting substrate.

5. A device as claimed in claim 1, in which a surface of the platelet carries an electrode structure.

6. A device as claimed in claim 1, in which the ferroelectric ceramic material is lanthanum-doped lead zirconate titanate.

* * * * *